United States Patent [19]

Balasubramanian

[11] 4,340,306
[45] Jul. 20, 1982

[54] OPTICAL SYSTEM FOR SURFACE TOPOGRAPHY MEASUREMENT

[76] Inventor: N. Balasubramanian, 20361 Chalet La., Saratoga, Calif. 95070

[21] Appl. No.: 117,855

[22] Filed: Feb. 4, 1980

[51] Int. Cl.³ .............................................. G01B 11/24
[52] U.S. Cl. .................................................... 356/360
[58] Field of Search ............................... 356/360, 354

[56] References Cited

U.S. PATENT DOCUMENTS

| | | | |
|---|---|---|---|
| 3,512,891 | 5/1970 | Baldwin | 356/360 |
| 3,694,088 | 9/1972 | Gallagher | 356/360 X |
| 3,937,580 | 2/1976 | Kasdan | 356/354 |
| 4,022,532 | 5/1977 | Montagnino | 356/360 |

OTHER PUBLICATIONS

Malacara, "Optical Shop Testing", (Wiley), pp. 17–19.
Massie, N. A., "Quasi-Reac-Time High Precision . . . Surfaces", SPIE, vol. 153, 1978, pp. 126–132.
Augustyn, Walter H., "Automatic Data Reduction . . . Patterns", SPIE, vol. 171, 1979, pp. 22–31.

Primary Examiner—John K. Corbin
Assistant Examiner—Bruce Y. Arnold
Attorney, Agent, or Firm—Thomas Schneck

[57] ABSTRACT

An interferometric system for characterizing the surface of a test object, such as an aspheric surface. A white light interferogram is produced wherein the principal fringe indicates zero optical path difference between a test surface and a reference surface. Wavefronts from either of the test or reference surfaces are translated by incremental amounts and after each translation the position of the principal fringe is noted by observing the loci of points of maximum contrast. By recording the points of maximum contrast and the incremental wavefront translation, two dimensional plots showing zero optical path differences for the two surfaces are obtained, thereby comparing the test and reference surfaces.

15 Claims, 4 Drawing Figures

→ TO REGISTERS (FIG. 2)

OPTICAL SYSTEM FOR SURFACE TOPOGRAPHY MEASUREMENT

BACKGROUND OF THE INVENTION a. Field of the Invention

The invention relates to an interferometric system for measuring the point-for-point distance deviation of an unknown surface from a known reference surface. The invention features a surface or a wavefront measuring interferometer system with a large measurement dynamic range. In particular, it deals with the method and apparatus for measuring optical path difference of a wavefront reflected from an unknown surface figure from that of a wavefront reflected from a known reference surface.

b. Prior Art

The use of interferometric systems for surface and wavefront measurement is well known in optics. In most of the automated interferometric surface measurement systems, the geometry and the shape of the fringes produced are analyzed to obtain the required measurement data. Such measurement systems are particularly useful for measuring and testing aspheric lens surfaces. In recent years there has been considerable interest in making use of complex and higher order aspheric surfaces in optical system design.

Aspheric lenses are well known in optics. For many years, simple aspherics, such as parabolic surfaces, have been used in telescopes. More recently, computer controlled lens grinding machines have been able to produce complicated aspheric lens surfaces. Some of these complicated aspheric surfaces are for spatial compression of multi-element convex-concave lens system. For example, in microscopes and cameras it has been the practice in the prior art to achieve desired corrections and magnifications by means of groups of lenses having specified concave or convex lens curvatures, refractive powers and spacings. Now, however, it is possible to produce a single aspheric lens which will replace a group of lenses.

When testing such surfaces using conventional interferometers, the density of the fringe pattern becomes too high and their shapes too complex to handle. A lack of good and simple means of testing such complex surfaces has been somewhat responsible for the delay in their widespread use. Even though the desired shape of a lens may be specified, it is difficult to determine when a precision surface has been attained. A precision surface is one having a point-for-point accuracy of the order of a fraction of a wavelength. The object of the present invention is to devise a method and apparatus for the testing of complex and higher order aspherical optical surfaces which are impossible to test based on existing testing methods.

In U.S. Pat. No. 4,022,532, issued May 10, 1977, to Montagnino teaches use of a dual beam laser interferometer for comparing phases of multiple reflective spots on a test object. A reference beam, whose path length is modulated, is combined with the light reflected from the spots. Separate detector elements measure the interference pattern from at least two spots simultaneously. A shift in position of one spot relative to a reference spot is determined by measuring the phase shift between spots. Using this approach, the surface configuration of an optical surface may be monitored.

In U.S. Pat. No. 3,694,088, issued Sept. 26, 1972 Gallagher et al. teach use of a dual beam laser interferometer for the study of intensity changes in a fringe pattern by means of a TV camera. The pattern intensity is changed twice by rotation of a quarter-wave plate, producing two known phase shifts. By storing pattern intensity values before and after the rotations, the intensity values can be correlated with the phase shift to solve simultaneous equations which yield phase and amplitude plots for the wavefront from the object under study.

In my prior patent application Ser. No. 912,212, now U.S. Pat. No. 4,225,240, an interferometric method is disclosed for measuring the optical path difference between a test surface and a reference surface. The method consists of varying the interferometric optical path length difference between a reference and a test surface in three steps at one-quarter wavelength intervals. Next, the intensity of the interferogram radiation is sensed at least at one position of the interferogram for each of the steps. The intensity sensed at each position and at each step is stored. For each of the positions the intensity of the first and third steps is added to produce a d.c. spatial frequency amplitude, and the intensity of the second step is subtracted from the d.c. amplitude to produce the sinusoidal spatial frequency amplitude. The sinusoidal and cosinusoidal amplitudes are combined to produce a trigonometric function of the phase angle of the radiation reflected from each position of the reference and test surfaces. This function is representative of the optical path length difference at each position. A multi-aperture CCD detector is used to detect intensity changes of the fringes. An advantage of my prior invention is that the sign of optical path differences may be determined, depending on whether the d.c. amplitude is larger or smaller than twice the intensity at the second step.

In the book "Optical Shop Testing" by Malacara (Wiley, publisher), p. 17 a procedure is described for determining the deviation of an aspheric surface from a spherical surface or an irregular surface from a reference flat surface. One surface is placed atop the other so that an optical path difference between the two will produce fringes when illuminated by a monochromatic source.

In an article entitled "Quasi-Real-Time High Precision Interferometric Measurements of Deforming Surfaces" in SPIE, Vol. 153 (1978) p. 126, Massie describes a system wherein two beams with orthogonal polarizations are shifted in frequency by different amounts using acousto-optic devices. The reference surface receives one polarization and frequency and the test surface the other. With appropriate optics the phase of one beam is compared to the other so that optical path differences can be mapped.

In an article entitled "Automatic Data Reduction of Both Simple and Complex Interference Patterns" in SPIE, Vol. 171 (1979) W. Augustyn discloses a computer fringe pattern analysis method whereby points on a reference interferogram representing zero path difference are placed in memory. Next, a test interferogram is generated and the stored points are subtracted from the actual. The difference between the two patterns is a new interferogram for user study.

White light interferometry has also been used for monitoring surfaces and surface profiles, but its application has been limited to interferometric objective lenses. The use of white light enables one to identify a zero-order fringe as the white light fringe and hence permits quantitative, but manual reduction of interferograms. This is extremely important when surface discontinuities are involved. Several microscope objectives that are capable of producing white light fringes on micro specimens are commercially available and they are typically used for measuring the film thicknesses and monitoring surfaces with discontinuities several wavelengths deep. Unlike other interferogram analyzers cited earlier no attempt has been made to automate the detection and interpretation of white light fringe patterns.

An object of the invention is to provide a simple and direct method for precision characterization of unknown surfaces which does not require visual fringe interpretation and which is suited to the measurement of discontinuous and steeply contoured aspheric surfaces.

SUMMARY OF THE INVENTION

The above object has been achieved in a test surface measuring system which features a white light dual beam interferometer. One beam has wavefronts reflected from the unknown test surface of a test object, while the other beam has reference wavefronts from a reference surface. Zero order fringes produced by interference of the two beams represent zero path differences, thereby indicating point coincidences between the reference surface and the test surface. A zero order fringe exhibits maximum contrast which is identified by modulating the phase of the reference wavefront by a predetermined amount. An array of points on the test surface may be measured by scanning the interference pattern, point by point, and recording contrast variations by means of a multi-aperture CCD detector, with a CCD aperture corresponding to each test point. If a maximum contrast level is observed by an aperture, that point is recorded as having zero path difference with respect to the reference surface.

After all of the points of the test surface have been scanned, the reference surface is moved by a predetermined amount and the process is repeated, again identifying points of maximum contrast. Now however, the points of maximum contrast are known to be coincident with corresponding points on the test surface, but offset by an amount by which the test surface was moved. After all points have been scanned, the test surface is again moved. Each movement of the test lens surface corresponds to a two dimensional slice of the test lens surface, with two pieces of data being recorded for each point: (a) the contrast maximum which was observed, (b) the slice number for which the maximum was observed. From the latter piece of data, the pointwise distance deviation of the test surface from the reference surface is known for zero path differences.

Advantages of the invention are as follows: (1) the measurement method relies on maximum contrast to establish zero path difference and thus constitutes a direct measurement of a surface, as opposed to indirect fringe interpretation methods; (2) the method may be used for non-regular reflective surfaces, such as semiconductor integrated circuits, as well as for aspheric optical surfaces, including steep aspheric surfaces.

DESCRIPTION OF THE PREFERRED EMBODIMENT

Figure 1:
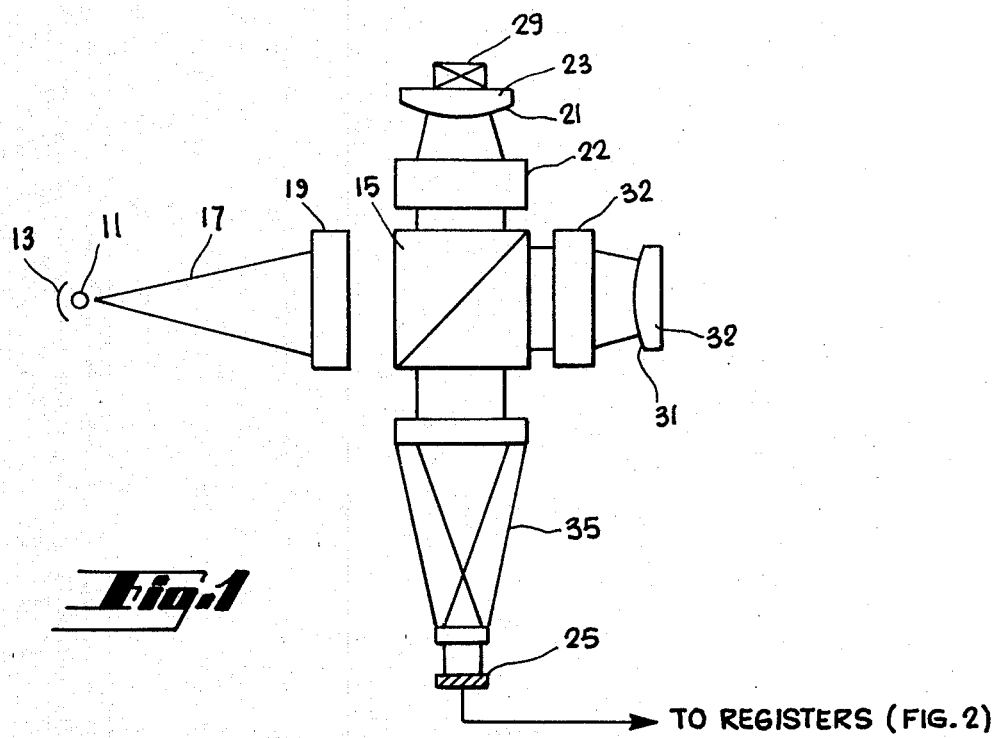
FIG. 1 is a plan view of an apparatus for use in the method of the present invention.

With reference to FIG. 1, a scanning dual beam interferometer of the Twyman-Green type is shown. Such interferometers have previously used laser or monochromatic sources. The long coherence length of these sources produced fringe patterns over an entire surface which were useful in interferometric measurements of surface contours. In contrast with prior practices, it has been discovered that for purposes of the present invention, the fringe patterns over the entire surface are not useful because the number and spacing of fringes makes fringe detection difficult.

It has been known that when a broad band source is used in an interferometer, as compared to a monochromatic source, the fringes are formed only when the optical path difference between the interfering wavefronts, D, is small. When the source band width is comparable to the mean wavelength, the fringe contrast reduces to a minimum, when the path difference is equal to the mean wavelength. This information is valuable since it permits one to detect optical path differences by measuring the fringe contrast. An ability to detect a fractional change in fringe contrast, say ten percent, will result in surface definition of 0.1 of the mean wavelength. The measurement of the contrast of white light fringes provides a means of identifying regions of a test wavefront that differ from the reference wavefront by no more than the specified amount, say 0.1 wavelength, as definition of equal phase contours.

With reference to FIG. 1, such a white light point source is located at region 11, in front of reflector 13 facing the beam splitter 15. The source may be a common incandescent high intensity lamp which projects a diverging beam 17 which is collimated by a collimator 19 prior to entering beam splitter 15. One portion of the beam is directed to the reference surface 21 of a reference object 23 through a focusing lens 22. The reference surface 21 has a precisely known topography, such as being spherical to within 0.05 wavelength. The surface need not be spherical and may have another precision shape, such as being flat. Under such conditions the focusing lens 22 is not used. Light is reflected from the reference surface 21 and passes through beam splitter 15 and through a focusing telescope 35 to a detector, such as diode array 25 which will be discussed below.

Another portion of beam 17 passes through beam splitter 15 and through a focusing lens 32, identical to focusing lens 22, to the unknown test surface 31 of an object 33 such as an aspheric lens. Light which is reflected from the unknown surface 31 is also directed by beam splitter 15 to the diode array 25. Both the reference wavefront from the reference surface 21 and the test wavefront from the test surface 31 pass through the focusing telescope 35. Telescope 35 produces a flat field image of the test and reference surfaces onto the diode array 25. The size of the image corresponds to the size of the detector.

The reference surface 21 and the test surface 31 must be slightly reflective to white light, at least 1%, so that an interference pattern can be formed. If one of the surfaces is completely absorptive of white light, it must be made slightly reflective, perhaps by means of a reflective coating, so that measurements can be made in accord with the present invention.

A piezoelectric transducer 29 is positioned behind the reference lens 23 for two purposes. A first purpose is to cause oscillations of the reference surface 21. The extent of these oscillations is less than one wavelength, preferably less than one-half wavelength. The purpose of the oscillations is to identify a contrast maximum at a detector, if one exists there. Such a contrast maximum is identified in the following way. The piezoelectric transducer 29 positioned behind the reference object 23 is caused to mechanically oscillate by application of an a.c. electrical driving signal. This causes an oscillating signal in each of the diodes in the diode array where interference fringes are formed. That oscillation may be considered an a.c. signal modulating the electrical intensity signal which is an output from each diode of the diode array. At each diode, both the intensity maximum and the intensity minimum are recorded and a contrast value is computed and represented by an electrical signal. If the resulting contrast signal has a value greater than a previous contrast level, then the position of the diode in the diode array is recorded, as explained below. In this manner, a two dimensional comparison has been made between the reference surface 21 having a known topography and the test surface 31 having an unknown topography. This two dimensional comparison was made to identify points where both the test surface 31 and the reference surface 21 have zero optical path differences.

The next step is to translate the surface 21 toward or away from the diode array 25 by a known amount, such as a fraction of the mean wavelength, so as to permit different regions of the test surface 31 to have zero path differences with the reference surface 21. This change in path length may be obtained by applying a d.c. voltage to the piezoelectric transducer 29, thereby producing a very slight mechanical translation of the surface 21 of the reference object 23 toward the diode array 25. This d.c. bias is maintained while the a.c. modulating signal is superimposed on the bias causing the previously described modulation of the reference surface 21. Once again, the diode array is scanned and intensity maxima and minima are recorded and contrast values are computed. Only contrast values at detector points having contrasts greater than previous contrast values are recorded.

Besides recording the points of maximum contrast, indicative of zero path length differences, the step level or translation extent for which the reference surface has been translated is also recorded. The step level corresponds to a distance that the reference optical path has been changed to establish zero optical path differences between the two surfaces. For each level or increment of change there is a two dimensional slice of the test surface at which there is a pointwise comparison with the reference surface, with each point corresponding to a diode in the detector array.

By sequentially increasing the d.c. bias on the transducer 29 by a given amount, the reference surface 21 is incrementally moved toward or away from diode array 25. Each increment is a known distance by which the reference optical path is changed. The extent of change, or total distance that the reference is moved corresponds to the thickness of the total of slices which characterize the test surface 31.

The information which is recorded consists of a two dimensional slice or slices having a resolution which corresponds to the spacing and the aperture of the diodes in the diode array 25. Output data characterizing an unknown test surface consists of position information within the diode array plus the step level. The shape of the test wavefront with respect to the reference wavefront is mapped by considering the points of the diode array at which maximum contrast has been recorded on each slice. Maximum contrast points on all such slices completely characterize the unknown surface. A precision of the order of 0.025 micron is easily obtained using the zero order fringe scanning method described herein. In the description of the method of the present invention, both the a.c. or oscillatory motion provided to the reference surface 21, as well as the d.c. or step translation of the reference surface 21 necessary to provide the incremented zero path differences for the test surface 31 have been generated by a single piezoelectric transducer 29. Alternatively, a separate transducer could be provided behind object 33 to provide either the a.c. component or the d.c. component, while the first transducer 29 produced the remaining component.

The range of deviation of the test surface from that of a reference surface that can be measured using this measurement concept depends on the range over which the phase of the reference wavefront can be scanned with the desired accuracy. Hence it is ideally suited for measuring non-regular reflective surfaces and steep aspheric surfaces.

The apparatus of FIG. 1 is especially useful for relatively small test surfaces, ranging from less than one millimeter to several centimeters in width. In general the reference surface is matched, as close as possible with an unknown test surface. For example, a convex aspherical test surface is matched with a convex spherical reference surface. A concave aspherical test surface is matched with a concave spherical reference surface. A continuous or discontinuous near planar test surface is matched with a planar reference surface.

Figure 2:
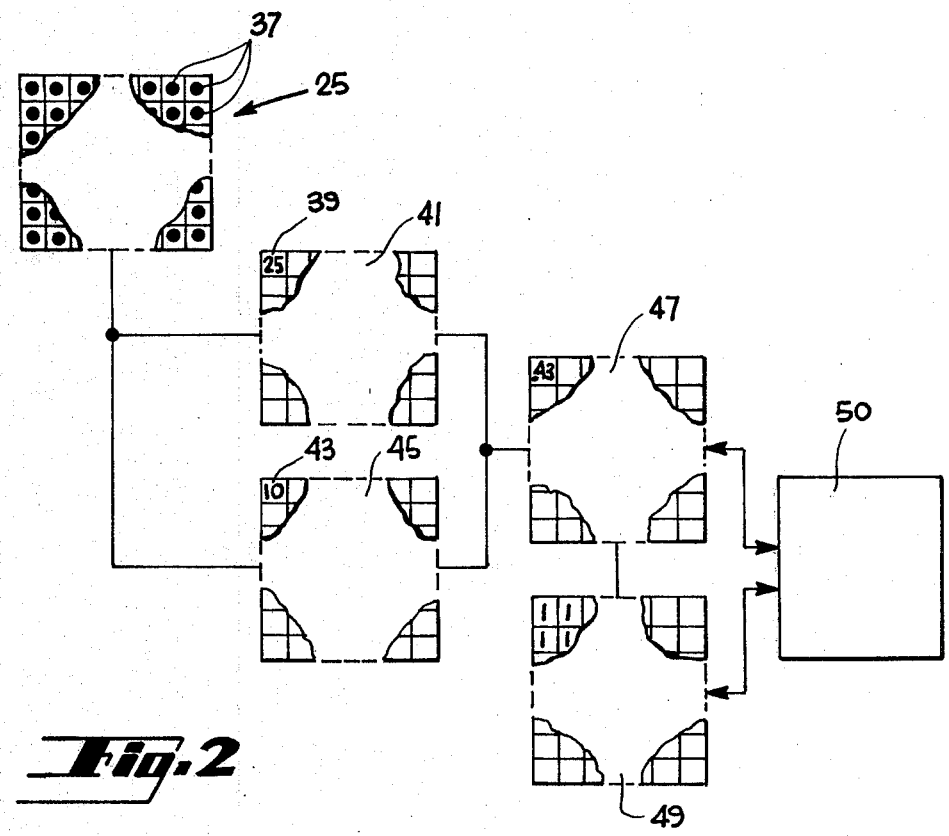
FIG. 2 is a simplified plan view of registers for data processing in accord with the method of the present invention.

Data acquisition for the method of the present invention may be understood in more detail with reference to FIG. 2. Typically, the diode array 25 would be a rectangular or square grid of diodes 37, each diode being mutually spaced and equidistant from all neighboring diodes. In FIG. 2, a typical array is shown having 100 diodes to a side or a total of 10,000 diodes. A typical size for such an array would be approximately 2 centimeters on a side. Such diode arrays are known as solid state self-scanning image photodetector arrays, such as Fairchild CCD 211; RCA 320 X512 CCD; Reticon RA-32X32A; and IPI 2D1. The array is usually scanned by sensing the intensity signal level of each detector element, one at a time, in sequence. Each diode is connected to a capacitor, such that diode conduction in response to light impinging on the diode causes a corresponding voltage drop charging a connected capacitor. The capacitor retains its charge long enough to be sensed. The voltage on the capacitor is proportional to the light intensity sensed by the diode. As previously mentioned, an a.c. modulation of one of the wavefronts is required. The maximum extent of modulation is plus or minus one half wavelength.

During this a.c. modulation, at a rate of say 2 Hz, the light intensity falling on each diode is scanned a sufficient number of times, say 50, to determine maximum and minimum intensities. Consider the diode in the upper left in the array 25. As the diode observes intensity shifts due to the a.c. modulation the maximum intensity is written in a corresponding cell 39, upper left, in the $I_{max}$ register 41, a memory unit having a number of memory locations or cells corresponding to the number of diodes in the detector 25. The minimum intensity is written in a corresponding cell 43 of the $I_{min}$ register 45, another memory having the same size as memory 41. This process is simultaneously carried out for all diodes of the detector array. Each cell in each of the intensity registers 41 and 45 will have a value recorded therein.

Now, a contrast calculation may be made using the formula that contrast is equal to $I_{max}-I_{min}/I_{max}+I_{min}$. The contrast value for each diode is recorded in the register 47, another memory of the same size as memory 41. The contrast values recorded in the cells of the register 47 represent contrast values observed by corresponding diodes in detector 25 for one slice of the test surface.

As previously mentioned, the path difference between the test surface and the reference surface is translated by a slight amount, say 0.1 wavelength. The amount of path length difference yields the ultimate mapping accuracy. Mapping at accuracies greater than 0.1 wavelength is possible because the path length difference may be adjusted by miniscule amounts, using the piezoelectric transducer 29 in FIG. 1. Variations as small as one or two atomic layers are theoretically possible. For a test surface having a depth of 50 wavelengths to be scanned, 500 levels, each 0.1 wavelength apart, are necessary. Of course greater or smaller levels can be taken, using larger or smaller separations. The smaller the separation, the greater the resolution and the measurement time. After the path length has been changed from one step to the next, the $I_{max}$ and $I_{min}$ registers of 41 and 45 are emptied. The values in the contrast register 47 are maintained. The step register 49 is loaded with ones in each cell, representing the fact that the contrast values in the contrast register 47 were obtained in the first step.

After the path length has been moved by the selected value, say 0.1 wavelength, each diode is again interrogated and intensity maxima and minima values are entered in each of the cells of the intensity registers 41 and 45. Again, contrast values are calculated in accord with the formula previously described. However, a contrast value for a respective diode is not entered in by controller 50 in a corresponding cell of the register 47 unless it is greater than the contrast value already existing in the same cell of the contrast register. If a replacement contrast value is entered in a cell of the contrast register 47 by controller 50, a corresponding entry is also made by controller 50 in the step register 49, indicating the step number at which the replacement value was entered. After a desired number of steps have been similarly processed, the contrast register 47 will contain in each cell the maximum contrast value which was seen at the various levels tested. The step register 49 will show the level numbers at which the contrast maxima were observed. In this manner, the existence of contrast maxima is known with respect to the precise deviation from the start. At these points, zero path length differences occur with respect to the reference surface. Thus, information in the contrast register 47 and the step register 49 provides two dimensional slices indicative of where zero optical path differences exist relative to the reference surface. By knowing the shape of the reference surface, a direct comparison may be made between the reference surface and the deviation of the test surface therefrom. Registers 41, 45, 47 and 49, as well as controller 50 may be part of a single computer system or separate units.

The data processing system and method described herein has the advantage that only a limited amount of data is stored. Assuming 500 levels to be scanned with 50 scans per diode and a total of 10,000 diodes, as in detector 25, approximately 250 million data points will be examined. But, using the data processing method described herein, only 40,000 points are ultimately recorded using that information, two for each diode with one point being the contrast value, the other being the level at which the contrast value occurred.

The measurement technique described above using two beam interferometers, such as a Twyman-Green interferometer, can also be carried out with common path interferometers. In two beam interferometers the reference and test beams travel widely separated paths and hence are differently affected by vibration and air turbulence. This problem is severe particularly when large aperture optical systems are involved. In common path interferometers, the reference and test beams traverse the same general path and hence are not greatly affected by problems of turbulence and vibration.

Figure 3:
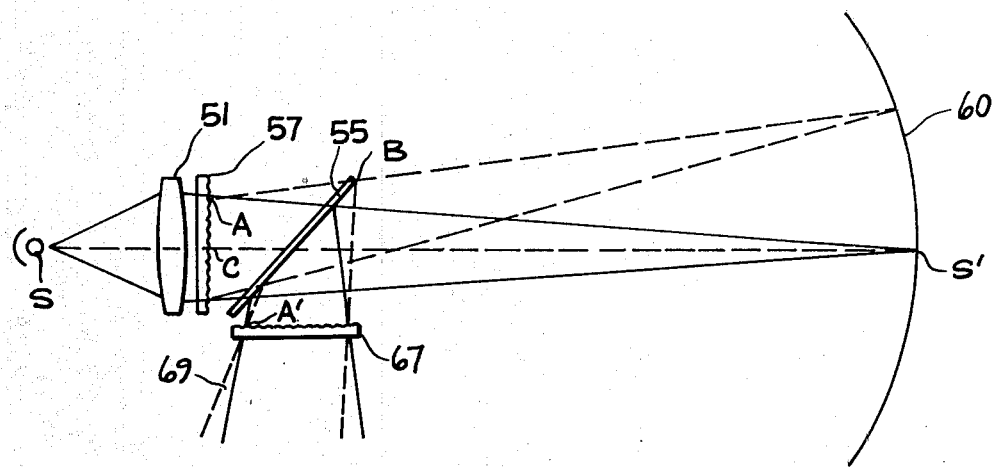
FIG. 3 is a plan view of a scatter plate interferometer of the prior art.

An example is the scatter plate interferometer shown in FIG. 3 and as further described in the book "Optical Shop Testing" by Malacara, page 818. The lens 51 forms an image of a small white light source S at region 5' on the mirror being tested. The scattering of the image beam by the scatter plate 57 forms several point source images over the rest of the test mirror 60.

The test mirror 60 forms an image of the scatter plate 57 onto an identical scatter plate 67, which is placed so that there is point for point coincidence between the scatter plates 57 and 67. A part of the light incident on the scatter plate 57 passes through it without scattering and arrives at region S'. Since this beam touches the mirror 60 only at a small region around S', it is not affected by the errors of the mirror surface. This beam acts as the reference beam. Some of the incident light is, however, scattered by scatter plate 57 and fills all of the aperture of mirror 60. This beam picks up the errors of the mirror and is the test beam.

Consider a ray incident at a point A on the scatter plate 57. The directly transmitted ray, the solid line in FIG. 3, follows the path through half mirror 55 designated by the letters AS'A'. After reflection downwardly from mirror 55, the ray encounters at image point A' a scattering center that is identical to the one at A. This ray is scattered at A' and gives rise to a cone of rays 69. The rays scattered at A, dotted lines, fill the mirror 60, arrive at the image point A', and pass through scatter plate 67 without scattering. Thus we have two mutually coherent beams emerging from scatter plate 67; one beam is directly transmitted by scatter plate 57 and scattered by scatter plate 67, and the second is scattered by scatter plate 57 and transmitted by scatter plate 67. An observer looking at the mirror surface 60 through scatter plate 67 will see an interferogram between these two beams. If the mirror is free of any error in the region of S', the interferogram will provide explicit information about the mirror aberrations, as in any separate-beam interferometer.

Figure 4:
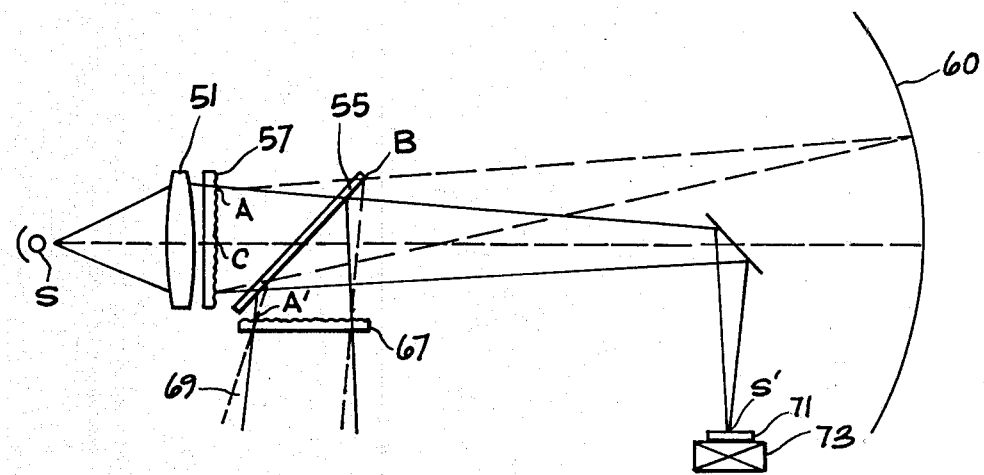
FIG. 4 is a plan view of a modified scatter plate interferometer in accord with the present invention.

This configuration can be slightly modified as shown in FIG. 4 to make use of the measurement method described in this invention. The reference beam, instead of being reflected by the center of the test mirror, is reflected by a piezo driven reference plane mirror 71. By translating the reference plane mirror 71 with a piezoelectric crystal 73, a zero path difference condition can be established for different zones of the test surface.

Both d.c. and a.c. translational motions are used as previously described, the d.c. component for testing incremental slices of the test surface and the a.c. component for finding contrast maxima. The motion of the reference mirror, as in the two beam interferometer, described with reference to FIG. 1, once again provides a means of quantitatively defining the test surface. Note that in FIG. 4 the reference surface figure is a vertex sphere of the test surface. This adaptation of the measurement technique is very important since it permits its use in cases involving large and steep astronomical mirror surfaces.

One type of non-regular reflective surface constitutes semiconductor integrated circuits, prior to packaging. Sometimes these circuits are existing on wafers, prior to scribing and breaking into individual units. Other times, the individual circuits are mounted on a carrier or holder. In either case, a beam from the beam splitter may be reflected from the surface and caused to form an interference pattern with the wavefront from the reference surface. The reference surface could be an optical flat and the deviations which are measured would be those of mesas formed by coatings having different step heights. Such step heights occur because of masking certain portions of the circuit and then dissolving or etching unmasked portions. There are also other reasons for these step heights. In semiconductor manufacturing, it is important to measure the step heights for quality control, research and failure analysis purposes.

In this application the references to wavelengths and fractions thereof refer to the mean wavelength of the white light source.

What is claimed is:

1. A non-contacting method for measuring deviations between a reference wavefront representing a reference surface and a test wavefront representing a test surface comprising, establishing a white light interference pattern on a detector between two wavefronts, one wavefront from at least one point on a reference surface of known topography and another wavefront from a corresponding point on a test surface of unknown topography, determining positions of maximum fringe contrast of the white light interference pattern thereby establishing zero optical path differences between said wavefronts, repeatedly translating one of the wavefronts from said surfaces by known incremental distances relative to the detector and establishing other white light interference patterns while establishing zero optical path differences between wavefronts from points on the reference surface and corresponding points on the test surface of unknown topography, recording the positions in each interference pattern of maximum fringe contrast and the corresponding step of incremental distance of surface translation relative to the starting point for each interference pattern, whereby the points of maximum fringe contrast at a given step represent points, the locus of which defines contours for which there is zero optical path difference between the test surface and the reference surface.

2. The method of claim 1 wherein the determining maximum fringe contrast is carried out by modulating the phase of one of the wavefronts by a predetermined amount, measuring maximum and minimum wavefront intensities and calculating contrast from maximum and minimum intensities.

3. The method of claim 2 further defined by calculating maximum fringe contrast at a plurality of elements in the detector array and recording the highest contrast value of each element for all of the white light interference patterns.

4. The method of claim 1 wherein the extent of translation for said one wavefront is of the order of a tenth of the mean wavelength of said white light.

5. A non-contacting method for measuring deivations between a reference surface and a test surface comprising, (a) establishing a white light interference pattern on a detector array for zero optical path difference between two wavefronts, one wavefront from at least one point on a reference signal surface of known topography and another wavefront from a corresponding point on a test surface of unknown topography;

(b) modulating the phase of one of said wavefronts by less than plus and minus one-half of the mean wavelength;

(c) repeatedly sampling the detector array and storing in a first register maximum intensities for sample positions in the interference pattern during modulation and in a second register corresponding minimum intensities;

(d) after several sampling cycles, storing in a third register contrast values for sample positions in the interference pattern computed using corresponding maximum and minimum intensities in the first and second registers;

(e) repeatedly translating the wavefronts from one of said surfaces by known incremental distances relative to the detector and establishing other white light interference patterns, in other spatial positions;

(f) repeating steps (a), (b), (c) and (d) for each spatial position white light interference pattern across the test surface;

(g) replacing stored contrast values in said third register with any higher contrast value computed in step (f), while simultaneously discarding lower contrast values, (h) storing in a fourth register, for corresponding positions in said third register, a step number representing an incremental distance at which the contrast value in the third register was stored, whereby maximum contrast values indicate equal phase contours for establishing zero optical path differences between said test surface and said reference surface.

6. The method of claim 5 wherein said modulating step is carried out by vibrating one of said surfaces back and forth.

7. The method of claim 5 wherein the extent of translation for the wavefront of one of said surfaces is of the order of a tenth of the mean wavelength of said white light.

8. An apparatus for measuring deviations between a reference surface and a test surface comprising, a white light interferometer having a mean wavelength of white light for producing an interference pattern from interfering wavefronts from a test surface and a reference surface;

means for varying the optical path length difference for interfering wavefronts between said test surface and reference surface by known incremental distances;

means for modulating the optical path length difference for interfering wavefronts between said test surface and reference surface continuously by up to plus and minus one half of the mean wavelength of said interferometer, a detector positioned for sensing the intensity of said interfering wavefronts, said detector having a plurality of detector elements therein, means for scanning said plurality of detector elements at each incremental distance to obtain from each cell signals representative of maximum and minimum intensity, a first register having cells for storing maximum intensities for each detector element, a second register having cells for storing minimum intensities for each detector element, a third register connected to said first and second register and having cells for storing contrast values derived from maximum and minimum intensities in corresponding cells of said first and second registers;

a fourth register connected to said third register and having cells for storing step numbers, each number representing an incremental distance at which a contrast value in a corresponding cell in the third register was stored;

control means connected to said third and fourth registers for discarding contrast values lower than the stored value in each cell and replacing said stored value with any higher value detected during steps of incremental distances, while simultaneously recording in said fourth register the step number at which maximum contrast is measured, whereby maximum contrast locations indicate contours of equal phase and zero path differences between said test surface and said reference surface.

9. The apparatus of claim 8 wherein the reference surface is a planar surface and the test surface is a continuous, near planar surface.

10. The apparatus of claim 8 wherein the reference surface is a planar surface and the test surface is a discontinuous, near planar surface.

11. The apparatus of claim 8 wherein the reference surface is a convex spherical surface and the test surface is a convex aspherical surface.

12. The apparatus of claim 8 wherein the reference surface is a concave spherical surface and the test surface is a concave aspherical surface.

13. The apparatus of claim 8 wherein the reference surface is a planar surface and the test surface is an aspherical mirror surface.

14. The apparatus of claim 8 wherein said interferometer is a Twyman-Green interferometer.

15. The apparatus of claim 8 wherein said interferometer is a scatter plate interferometer.

* * * * *